United States Patent
Kanshin et al.

(10) Patent No.: US 10,216,888 B2
(45) Date of Patent: Feb. 26, 2019

(54) CONSTRAINT VALIDATION PROCESS

(71) Applicant: Cadence Design Systems, Inc., San Jose, CA (US)

(72) Inventors: Mikhail Kanshin, Moscow (RU); Andrey Freidlin, Zhyukovskiy (RU); Alexey Kalinov, Moscow (RU); Andrei Savelev, Moscow (RU); Douglas M. Den Dulk, Apex, NC (US); Wojciech Wojciak, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 94 days.

(21) Appl. No.: 15/142,843

(22) Filed: Apr. 29, 2016

(65) Prior Publication Data

US 2017/0109469 A1 Apr. 20, 2017

(51) Int. Cl.
*G06F 17/50* (2006.01)
(52) U.S. Cl.
CPC .................. *G06F 17/5081* (2013.01)
(58) Field of Classification Search
USPC ........................................................ 716/112
See application file for complete search history.

(56) References Cited

U.S. PATENT DOCUMENTS

| | | | |
|---|---|---|---|
| 6,324,678 B1 | 11/2001 | Dangelo et al. | |
| 6,470,482 B1 | 10/2002 | Rostoker et al. | |
| 7,398,492 B2 | 7/2008 | Youngman et al. | |
| 7,945,878 B2 | 5/2011 | Youngman et al. | |
| 2009/0077510 A1 | 3/2009 | Youngman et al. | |
| 2010/0306720 A1* | 12/2010 | Pikus | G06F 17/5081 716/106 |
| 2013/0198704 A1* | 8/2013 | Hogan | G06F 17/5022 716/109 |
| 2014/0089877 A1* | 3/2014 | Salem | G06F 17/5081 716/112 |

FOREIGN PATENT DOCUMENTS

| | | |
|---|---|---|
| EA | 014277 B1 | 10/2010 |
| RU | 2452004 C2 | 5/2012 |
| RU | 2463650 C2 | 10/2012 |
| RU | 132297 U1 | 9/2013 |
| RU | 2543300 C2 | 2/2015 |

OTHER PUBLICATIONS

Notification on Results of Patentability Check and Federal Service on Intellectual Property Search Report issued in related Russian Patent Application No. 20150144655/08(068778), dated Aug. 24, 2016 (13 pages).

* cited by examiner

*Primary Examiner* — Bryce M Aisaka
(74) *Attorney, Agent, or Firm* — Mark H. Whittenberger, Esq.; Holland & Knight LLP

(57) ABSTRACT

The present disclosure relates to a system and method for constraint validation in an electronic design. The method may include receiving an electronic design at an electronic design automation application and analyzing at least a portion of the electronic design at a constraint validation tool configured to analyze one or more physical constraints in a design layout associated with the electronic design. The method may further include applying one or more programmable electrical rule check ("PERC") rules and one or more constraints to the electronic design, wherein the one or more PERC rules are configured to perform one or more electrical rule checks.

16 Claims, 8 Drawing Sheets

CONSTRAINT VALIDATION PROCESS

CROSS-REFERENCE TO RELATED APPLICATIONS

The subject application claims the priority of Russian Patent Application No. 2015144655, filed 16 Oct. 2015, the entire content of which is herein incorporated by reference.

FIELD OF THE INVENTION

The present disclosure relates to electronic design automation (EDA), and more specifically, to a method for electrical custom constraint validation.

DISCUSSION OF THE RELATED ART

EDA utilizes software tools that may be used in the design and analysis of numerous electronic systems such as printed circuit boards (PCBs) and integrated circuits (ICs). Some EDA tools include physical verification systems ("PVS") such as those available from the Assignee of the present disclosure. These physical verification systems may allow for in-design and back-end physical verification, constraint validation, and reliability checking. PVS systems may also enable users to achieve advanced node design signoff in a quick total turnaround time as well as providing efficient, effective debug tools to reduce debug time and increase productivity.

SUMMARY OF INVENTION

In one or more embodiments of the present disclosure, a computer-implemented method for constraint validation in an electronic design is provided. The method may include receiving an electronic design at an electronic design automation application and analyzing at least a portion of the electronic design at a constraint validation tool configured to analyze one or more physical constraints in a design layout associated with the electronic design. The method may further include applying one or more programmable electrical rule check ("PERC") rules and one or more constraints to the electronic design, wherein the one or more PERC rules are configured to perform one or more electrical rule checks.

One or more of the following features may be included. In some embodiments, the one or more constraints may include virtual constraints or custom electrical constraints. In some embodiments, applying one or more custom electrical constraints may include receiving a custom electrical constraints definition file. In some embodiments, the method may further include generating at least one custom constraint at a constraint manager associated with the electronic design automation application. Applying one or more PERC rules may include applying the one or more PERC rules as a constraint validation function. The method may also include enabling multi-directional data transmission between at least two of the electronic design automation application, the constraint validation tool, and the one or more PERC rules. The method may further include specifying a topological structure of interest associated with the electronic design. In some embodiments, the virtual constraints may include at least one net or device associated with the topological structure. The one or more PERC rules may include at least one command configured to enable searching topological patterns in a dumped netlist associated with the electronic design. The method may also include converting the one or more virtual constraints to actual constraints and generating a database including, at least in part, the actual constraints.

In one or more embodiments of the present disclosure, a system may include a computing device configured to receive an electronic design at an electronic design automation application. The computing device may be further configured to analyze at least a portion of the electronic design at a constraint validation tool configured to analyze one or more physical constraints in a design layout associated with the electronic design. The computing device may be further configured to apply one or more programmable electrical rule check ("PERC") rules and one or more constraints to the electronic design, wherein the one or more PERC rules are configured to perform one or more electrical rule checks.

One or more of the following features may be included. In some embodiments, the one or more constraints may include virtual constraints or custom electrical constraints. In some embodiments, applying one or more custom electrical constraints may include receiving a custom electrical constraints definition file. The computing device may be further configured to generate at least one custom constraint at a constraint manager associated with the electronic design automation application. In some embodiments, applying one or more PERC rules may include applying the one or more PERC rules as a constraint validation function. The computing device may be further configured to enable multi-directional data transmission between at least two of the electronic design automation application, the constraint validation tool, and the one or more PERC rules. The computing device may be further configured to specify a topological structure of interest associated with the electronic design. In some embodiments, the virtual constraints may include at least one net or device associated with the topological structure. The one or more PERC rules may include at least one command configured to enable searching topological patterns in a dumped netlist associated with the electronic design. The computing device may be further configured to convert the one or more virtual constraints to actual constraints and to generate a database including, at least in part, the actual constraints.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
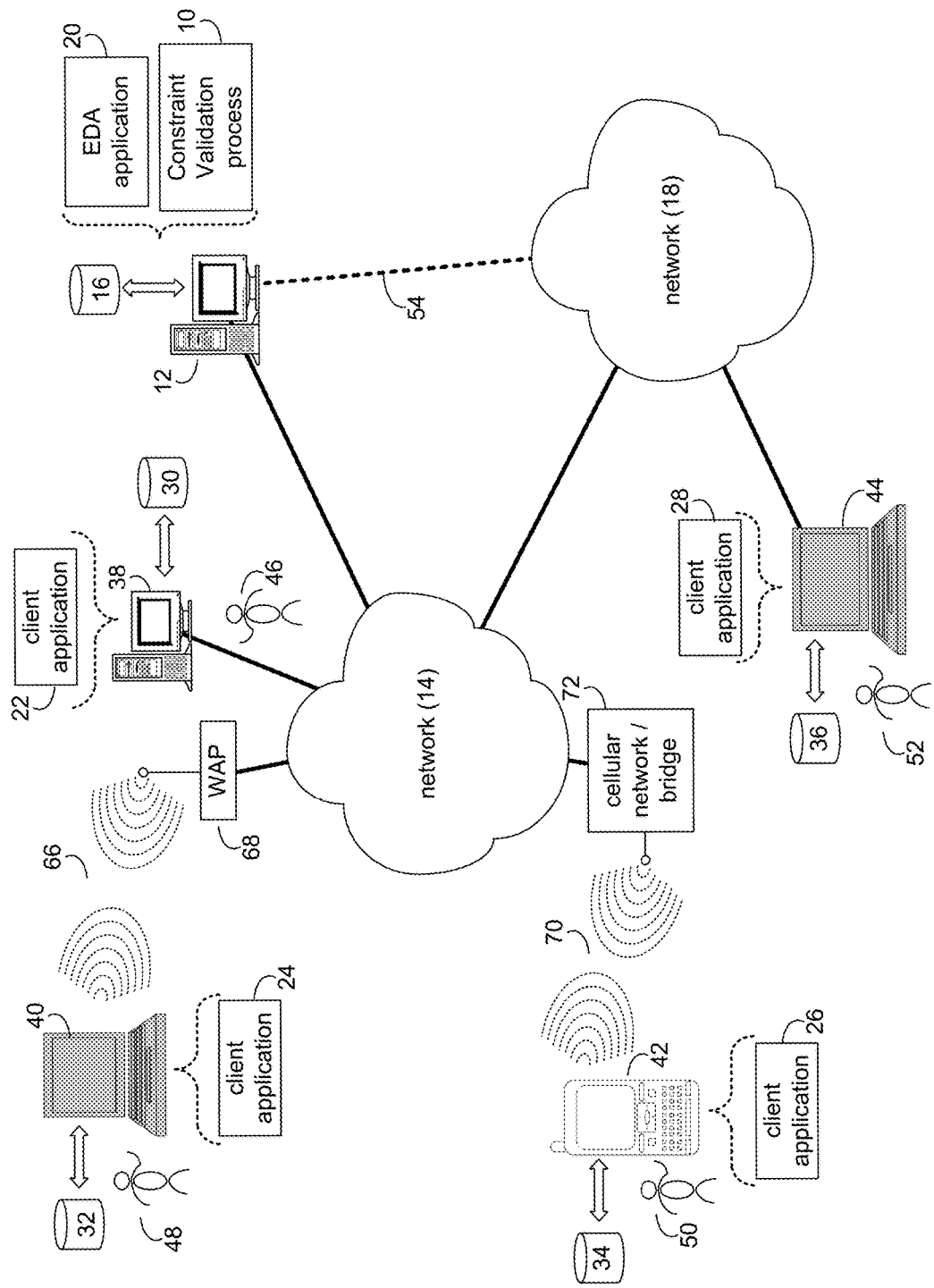
FIG. 1 is a system diagram depicting aspects of the constraint validation process in accordance with an embodiment of the present disclosure.
Figure 2:
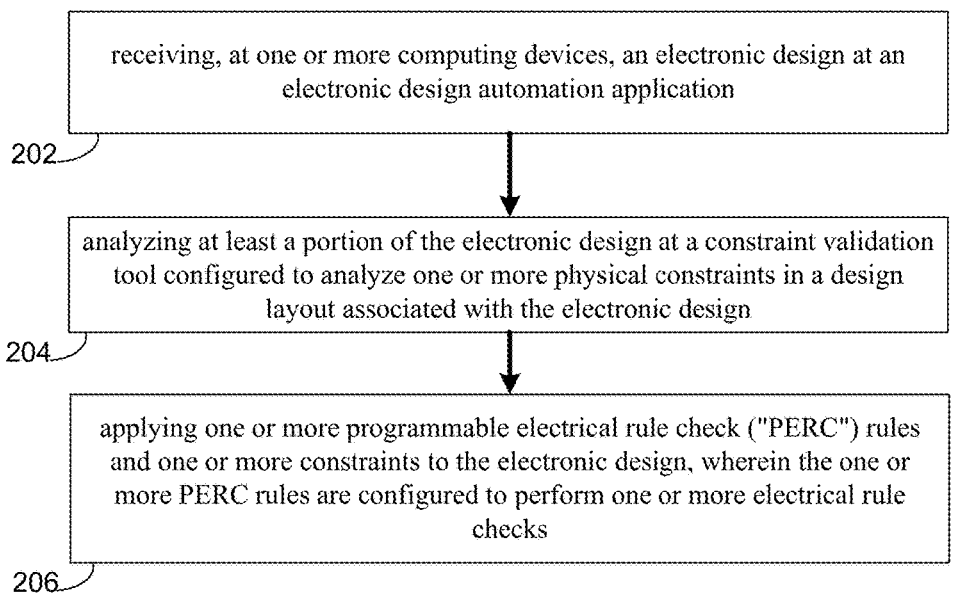
FIG. 2 is a flowchart depicting operations consistent with the constraint validation process of the present disclosure.

Referring to FIG. 1, there is shown constraint validation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the constraint validation process may reside on and be executed, in whole or in part, by a client electronic device, such as a personal computer, notebook computer, personal digital assistant, or the like.

The instruction sets and subroutines of constraint validation process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Constraint validation process 10 may be a stand-alone application, or may be an applet/application/script that may interact with and/or be executed within EDA application 20. In addition/as an alternative to being a server-side process, the constraint validation process may be a client-side process (not shown) that may reside on a client electronic device (described below) and may interact with an EDA client application (e.g., one or more of EDA client applications 22, 24, 26, 28). Further, the constraint validation process may be a hybrid server-side/client-side process that may interact with EDA application 20 and an EDA client application (e.g., one or more of client applications 22, 24, 26, 28). As such, the constraint validation process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize constraint validation process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Embodiments of constraint validation process 10 shown in FIGS. 1-8 may provide for constraint validation in an electronic design. The process may include receiving (202), at one or more computing devices, an electronic design at an electronic design automation application. The process may further include analyzing (204) at least a portion of the electronic design at a constraint validation tool configured to analyze one or more physical constraints in a design layout associated with the electronic design. The process may also include applying (206) one or more programmable electrical rule check ("PERC") rules and one or more constraints to the electronic design, wherein the one or more PERC rules are configured to perform one or more electrical rule checks. Numerous additional operations and features are also within the scope of the present disclosure as discussed in further detail hereinbelow.

The design development process allows for designers to declare their intention for the final design configuration (e.g., layout or schematic), obtain assistance from the tool to follow this intention and finally validate that all intentions, expressed in form of constraints, are met. This requirement may be addressed by the constraint driven flow. This flow may be designed to receive input related to the designer's intentions, which may be a weakness of certain approaches. For example, if the designer's input is missed or incorrect, then the flow may have limited value.

Accordingly, embodiments of constraint validation process 10 may be configured to reduce the importance of the designer's input. Embodiments of constraint validation process 10 may provide a platform which allows for the specification of best practice guidelines for a particular design/technology and may validate that the design and IP blocks follow these specified "best practice" guidelines. The "best practice" guidelines may be obtained using any suitable approach, some of which may include, but are not limited to, being provided by the foundry, formulated by the designer community, and/or by the internal process design kit team based on previous experience, etc.

In some embodiments, the "best practice" guidelines may declare that some specific topological patterns widely used in modern designs are internally constrained by their nature. (e.g., a current mirror requires some symmetry, differential pairs of devices may require device parameter/topology matching, etc.). Such implicit constraints cannot be checked using traditional techniques because they may not actually exist in the design as they are "virtual" in nature. The designer may also associate additional intents with the objects of such topological patterns.

Embodiments of constraint validation process 10 may be configured to follow such "best practice" guidelines and additional designer's intents through an automated solution which provides the infrastructure to define the specific topological patterns and "best-practice" guidelines for them through the virtual constraints. In some embodiments, constraint validation process 10 may also perform automated searches of these specific topological patterns in the design, review the "best-practice" guidelines for them and report the results of the check.

Figure 3:
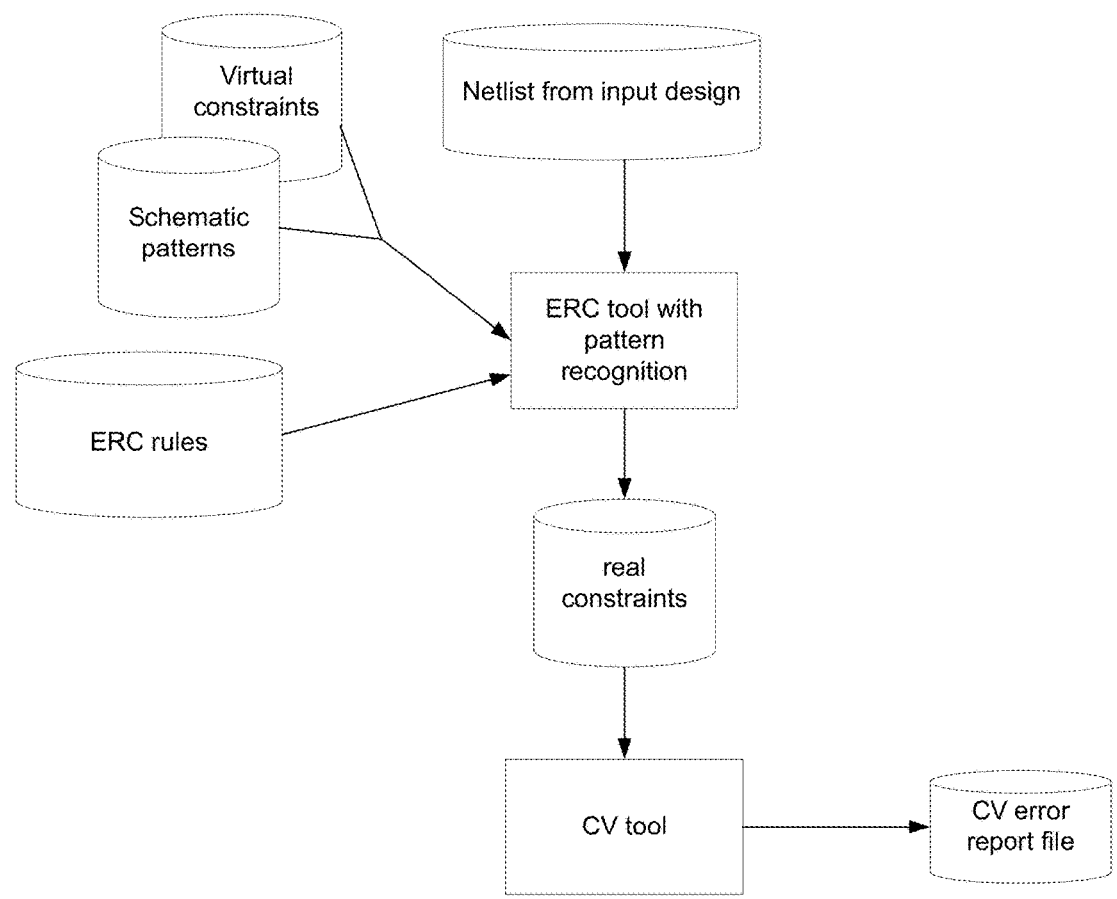
FIG. 3 is a schematic depicting aspects of the constraint validation process in accordance with an embodiment of the present disclosure.
Figure 4:
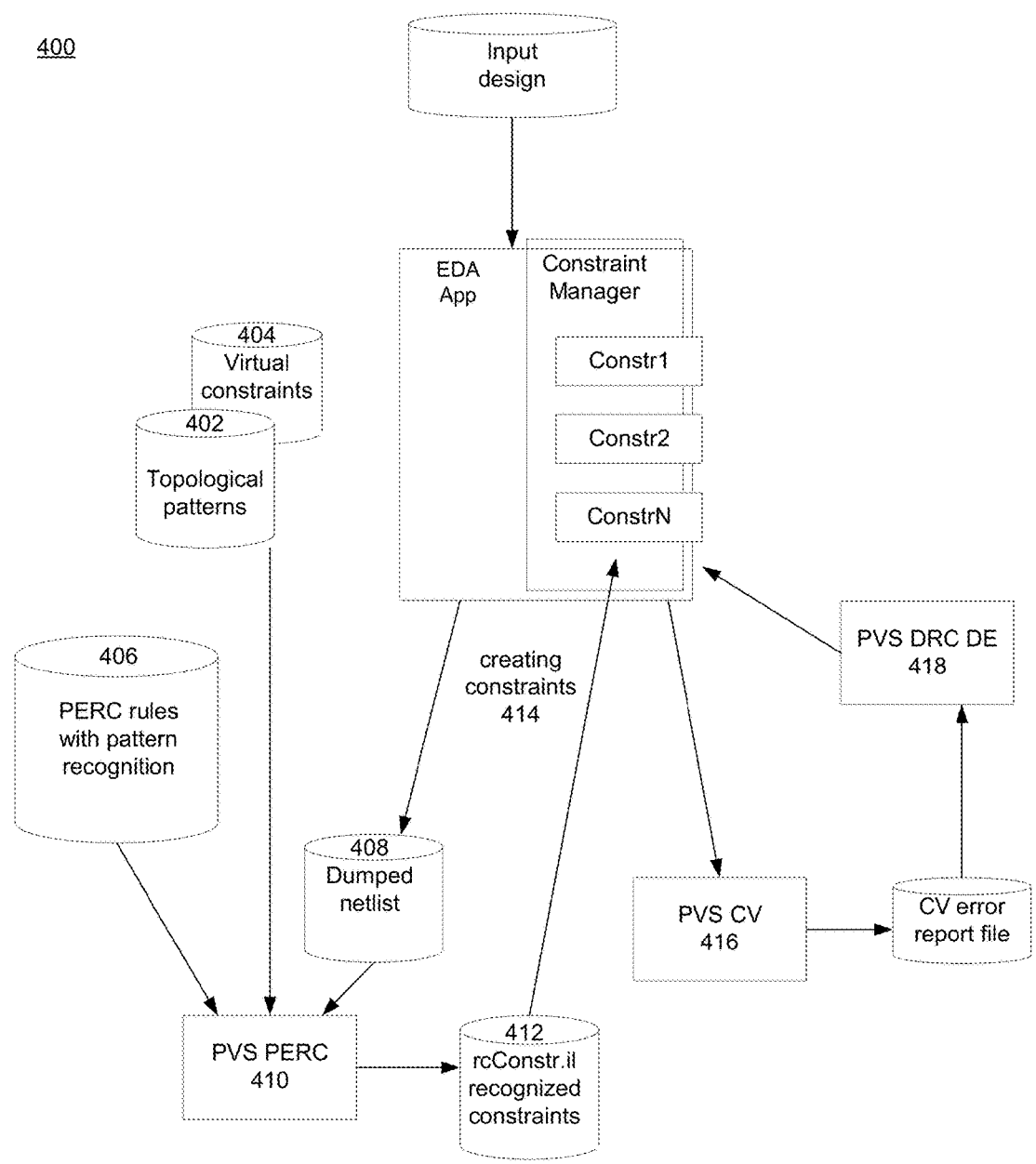
FIG. 4 is a schematic depicting aspects of the constraint validation process in accordance with an embodiment of the present disclosure.

Referring now to FIGS. 3-4, embodiments consistent with constraint validation process 10 are provided. Constraint validation process 10 may utilize an automated approach that may include one or more physical verification tools. Some of these may include, but are not limited to, a Programmable Electrical Rule Checker ("PERC"), which may perform the topological structure recognition and a Constraint Validation ("CV") tool, which may be configured to check physical constraints in layout. Examples of PERC and CV tools are available from the Assignee of the present disclosure.

In some embodiments, a PERC may provide the ability to find and recognize multiple occurrences of some specific schematic structures of interest in the netlist and may also be configured to define some specific PERC rules on devices and nets (e.g., that may be constraint members) and subsequently check them. Additionally and/or alternatively, the CV tool may provide the ability to handle different types of constraints including the validation of custom constraints. Embodiments of constraint validation process 10 may incorporate the functionality of each of these tools as is discussed in further detail hereinbelow.

In some embodiments, constraint validation process 10 may be configured to define specific topological structures of interest or topological patterns. Additionally and/or alternatively, constraint validation process 10 may be configured to specify the "best practice" guidelines through the virtual constraints and associate them with particular patterns, with devices and nets as abstract members of the virtual constraints. In some embodiments, if a virtual constraint is specified here, it may not cease to be virtual because it may not be related to real objects in the design, but to abstract objects of the pattern.

Figure 5:
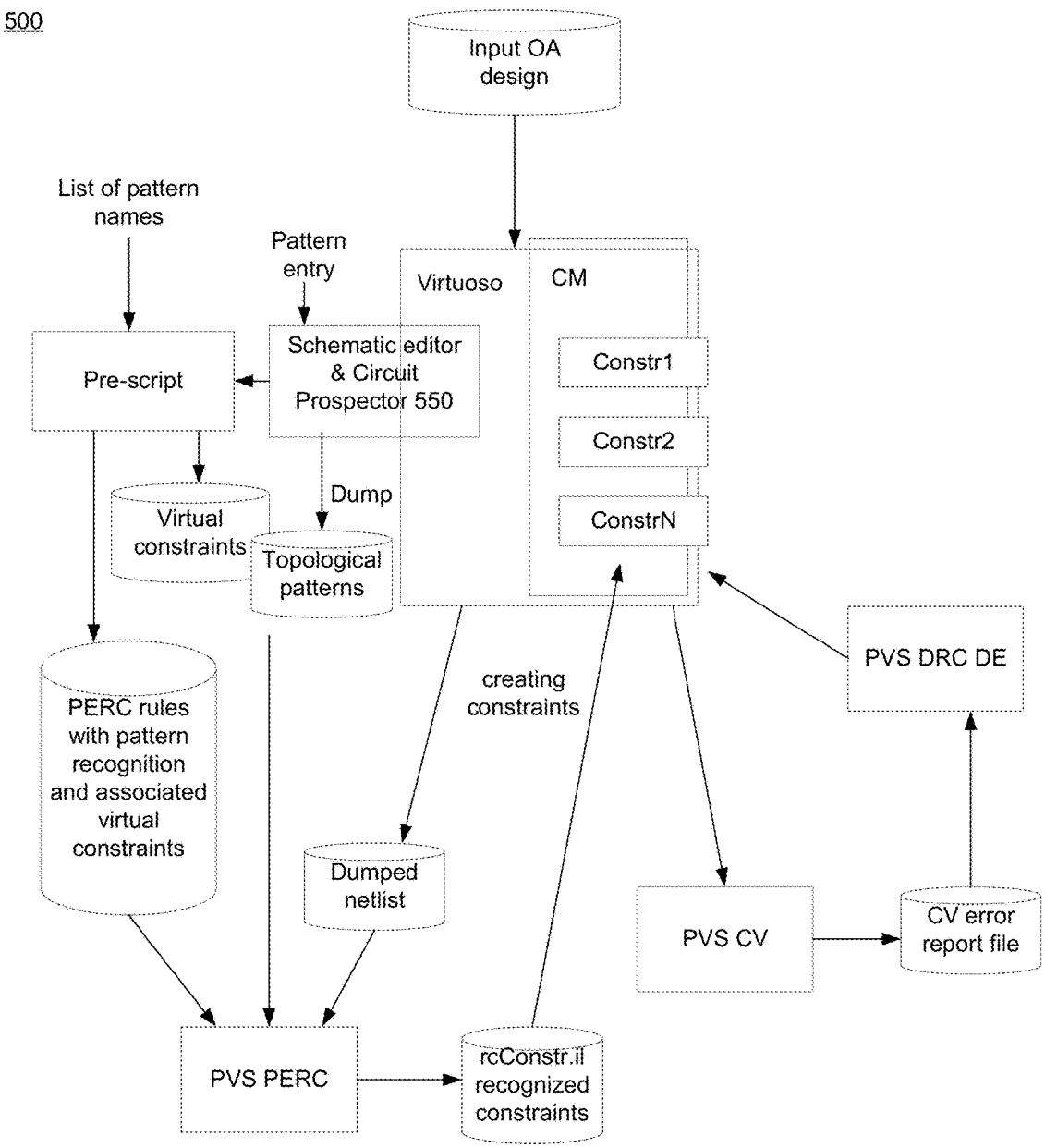
FIG. 5 is a schematic depicting aspects of the constraint validation process in accordance with an embodiment of the present disclosure.

As shown in FIGS. 3-5, embodiments consistent with constraint validation process 10 are provided. Referring specifically to FIG. 4, the process may include specifying a topological pattern or structure of interest 402. In some embodiments, this may include a special pattern library specified in any language (e.g., cycle design language ("CDL"), etc.). The process may also include specifying virtual constraints 404 containing the abstract members (e.g., nets and devices of the pattern), which these constraints may be associated with.

In some embodiments, PERC rule file 406 may include commands for searching topological patterns in a dumped netlist of input design 408. Constraint validation process 10 may be configured to utilize these patterns and virtual constraints. PERC 410 may locate all occurrences of the appropriate structures in the dumped netlist 408 of the input design (the structures that match the pattern). PERC 410 may also be configured to convert virtual constraints to real ones (e.g., abstract members may be substituted with real members from the netlist for each recognized structure) and write them into a scripting language procedures (e.g., a SKILL procedure) in the recognized constraint file 412 aimed for creating constraints. In some embodiments, the scripting language procedures in the recognized constraint file 412 may allow for the creation of constraint objects 414 in a database (e.g., an input open access ("OA") database, etc.) in the proper location with appropriate net/device members. It is implied that dumped netlist 408 and the design layout in the database may have mutual correspondence. Therefore, avoiding any problems with respect to properly defining constraint members and constraints in the input layout (e.g. OA, etc.). The resulting database with created real constraints may be used as an input for PVS CV 416 to check all created constraints and pass any identified errors to an error browser for debugging 418.

In some embodiments, PERC 410 may be configured to review the electronic design and to locate and recognize multiple occurrences of these topological patterns automatically. At the moment when this particular occurrence has been located, associated 'virtual' constraints may be converted to real ones with real members (e.g., devices and nets) taken from the design. CV 416 may be configured to read these constraints with their members and check them in the design layout. Accordingly, constraint validation process 10 may be configured to allow for the integration of multiple EDA tools (e.g., PERC and CV, etc.) to address many of the issues inherent in previous systems.

The embodiments depicted in FIGS. 3-5 may allow for the validation of virtual constraints that are either naturally inherent for a specific topology or specially defined by a designer. These constraints may be of any type supported by the physical verification system. For example, some of these may include, but are not limited to, symmetry, diff pair, matched length, shielding, matched parameters, matched topology, etc. These topological patterns may be automatically searched in the input design. Appropriate virtual constraints may be converted to real ones and then validated in the input design layout. Accordingly, this approach may allow designers to validate that the real layout satisfies these constraints and the appropriate "best practice" guidelines.

As discussed above, constraint validation process 10 may provide an automated solution that may decrease the need for the manual input from the designer. In some embodiments, the virtual constraints, which may be defined for a topological pattern, may be searched over the electronic design and converted to real constraints for each recognized occurrence of the pattern. It should be noted that constraint validation process 10 may be used in conjunction with any suitable format (e.g., open access ("OA"), graphic database system ("GDSII"), open artwork system interchange standard ("OASIS"), etc.) and/or those that cannot contain constraints. As such, in some embodiments, a verification step may be included (e.g., layout versus schematic ("LVS"), etc.) and PERC may be applied to the extracted netlist to search topological structures that match patterns containing virtual constraints.

Referring also to FIG. 5, another embodiment 500 consistent with constraint validation process 10 is provided. In this particular example, a circuit prospector tool and schematic editor, such as those available from the Assignee of the present disclosure, may be configured to allow for the proposal and creation of automatically appropriate constraints for the specific schematic after its analysis. The schematic editor may be configured to provide numerous capabilities to facilitate fast and easy design entry. Constraint validation process 10 may utilize one or more well-defined component libraries that may allow for faster design at both the gate and transistor levels. Sophisticated wire routing capabilities may further assist in connecting devices. For larger and more complex designs, the schematic editor may not only support multi-sheet designs but also provide the ability to design hierarchically, with no limit on the number of levels used. A hierarchy editor may be included that may be configured to make hierarchical designs easy to traverse, and automatically ensures all connections are maintained accurately throughout the design. In some embodiments, various flows and embodiments described herein may operate in a coordinated approach (e.g., using a Circuit Prospector and the PERC+CV integrated flow). As shown in FIG. 5, the schematic editor and circuit prospector 550 may receive a topological pattern of interest with constraints which may be analyzed as 'virtual' constraints.

Figure 6:
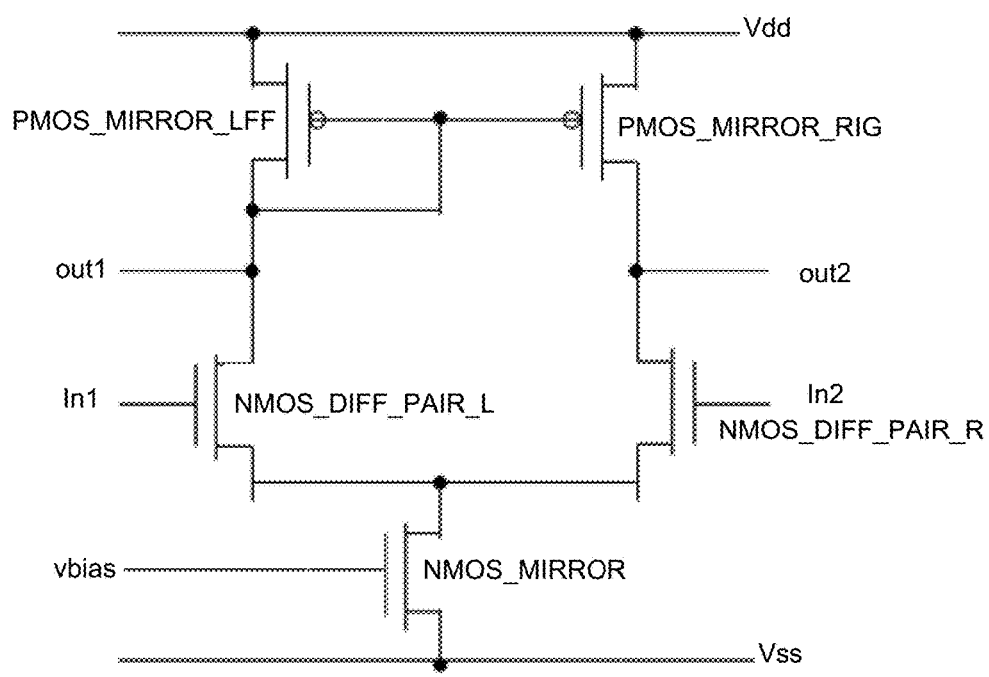
FIG. 6 is a schematic depicting a differential amplifier in accordance with an embodiment of the present disclosure.

Referring now to FIG. 6, an embodiment of constraint validation process 10 depicting a schematic structure showing an example of a differential amplifier 600. In this particular example, there are certain conditions that must be met. Namely, the devices PMOS_MIRROR_LEFT and PMOS_MIRROR_RIGHT of the differential amplifier 600 have the same model name (subtype), number of fingers (>=1), finger width, and finger length, etc. Additionally and/or alternatively, PMOS_MIRROR_LEFT and PMOS_MIRROR_RIGHT of differential amplifier 600 should be symmetrically placed. If a designer has one or more differential amplifier structures in the design, they may want to check how well they are implemented in the design in terms of these conditions (e.g., determining if the above conditions are good enough to be kept in the layout).

In some embodiments, these conditions may be expressed via set of constraints. It is implied that the following 'virtual' constraints may be associated with this structure:

matchedParameters constraint with device members PMOS_MIRROR_LEFT, PMOS_MIRROR_RIGHT;

Symmetry constraint (for symmetrical structure) with device members PMOS_MIRROR_LEFT, PMOS_MIRROR_RIGHT;

In some embodiments, these constraints on the differential amplifier may be checked by PVS CV. This may involve some or all of the operations outlined below:

Receiving a description of structure of interest (e.g. CDL, etc.).

An example CDL description of the schematic on FIG. 6 is provided below:

```
.subckt DiffAmp Vdd Vss In1 In2 out1 out2 vbias
PMOS_MIRROR_LEFT out1 out1 Vdd Vdd pmos
PMOS_MIRROR_RIGHT out2 out1 Vdd Vdd pmos
NMOS_DIFF_PAIR_LEFT out1 In1 net1 Vss nmos
NMOS_DIFF_PAIR_RIGHT out2 In2 net1 Vss nmos
NMOS_MIRROR net1 vbias Vss Vss nmos
.ends
```

PERC may locate all occurrences of the structure of interest using, for example, the following code in the PERC deck:

```
The pattern searching
set pattern_of_interest   [perc::find_pattern   -pattern
DiffAmp -binding { PMOS_MIRROR_LEFT $dev }]
if { $pattern_of_interest eq "" } {
Pattern is not found. Exit.
return 0
}
```

Virtual constraints for this structure (for each found structure) may be defined, for example, by the following code in the PERC deck:

```
virtual constraints for DiffAmp
perc::instSymmetry
perc::device_in_pattern    $pattern_of_interest   -name
PMOS_MIRROR_LEFT]
perc::device_in_pattern    $pattern_of_interest   -name
PMOS_MIRROR_RIGHT]
"content" "per-layer" "diff_amp"
"Device symmetry in diff_amp pattern"

perc::matchedParameters
perc::device_in_pattern    $pattern_of_interest   -name
PMOS_MIRROR_LEFT]
perc::device_in_pattern    $pattern_of_interest   -name
PMOS_MIRROR_RIGHT]
<list of parameters to be matched> "diff_amp"
"Device matched parameters in diff_amp pattern"
```

In some embodiments, for each occurrence, PERC may convert virtual constraints to real ones. The result of the procedure perc::instSymmetry is SKILL code that creates real constraint with real members in the database (e.g., an OA database). The result of the procedure perc::matchedParamaters is SKILL code that creates real constraints with real members in the database (e.g., an OA database). PVS CV reads the database (e.g., an OA database) of the design with created constraints inside and checks these recognized constraints in the layout data of the design.

In some embodiments, conditions for differential pair (matching pair) of devices may include some or all of the following conditions. The devices of the differential pair M1 and M2 must be equivalent. The common node has to be connected to tail current device M5. This device should have the same subtype as the differential-pair. The drains of differential-pair need to be connected to equal loading devices M3, M4. The distance between the devices of differential-pair should be within some predefined value.

In some embodiments, these conditions may be expressed via set of constraints. It is implied that the following 'virtual' constraints can be associated with this structure:
M1, M2 matchedParameters;
M1, M2 matchedTopology or Symmetry (for symmetrical diff pair);
M3, M4 matchedParameters;
M3, M4 matchedTopology or Symmetry (for symmetrical diff pair);
Distance constraint on M1, M2 with max distance.
For the symmetrical diff pair:
M5 self-symmetry;
Net D self-symmetry;
Nets A, B symmetry;
Optionally, in some embodiments, a user may add the following constraints (e.g., if user wants to check antenna diodes in sync).
matchedParameter on diodes M6, M7;
matchedTopology on diodes M6, M7;
matchedLength on net E, F.

In some embodiments, if a designer has differential pairs of devices in his/her design, he may want to check how well they are implemented in the design (e.g., to check if the above conditions are good enough kept in the layout for all diff pairs of devices). These conditions may be expressed via set of constraints specified above, and they can be checked by PVS CV. This may involve some or all of the operations outlined below:
  Receiving a description of structure of interest (e.g. CDL, etc.)
  In the PERC rule file: write code for searching this structure and define virtual constraints for this structure.
  PERC may run with this rule file, locate all occurrences of the structure of interest and for each occurrence convert virtual constraints to real ones.
  PVS CV may accept and check recognized constraints in layout data of the design.

Figure 7:
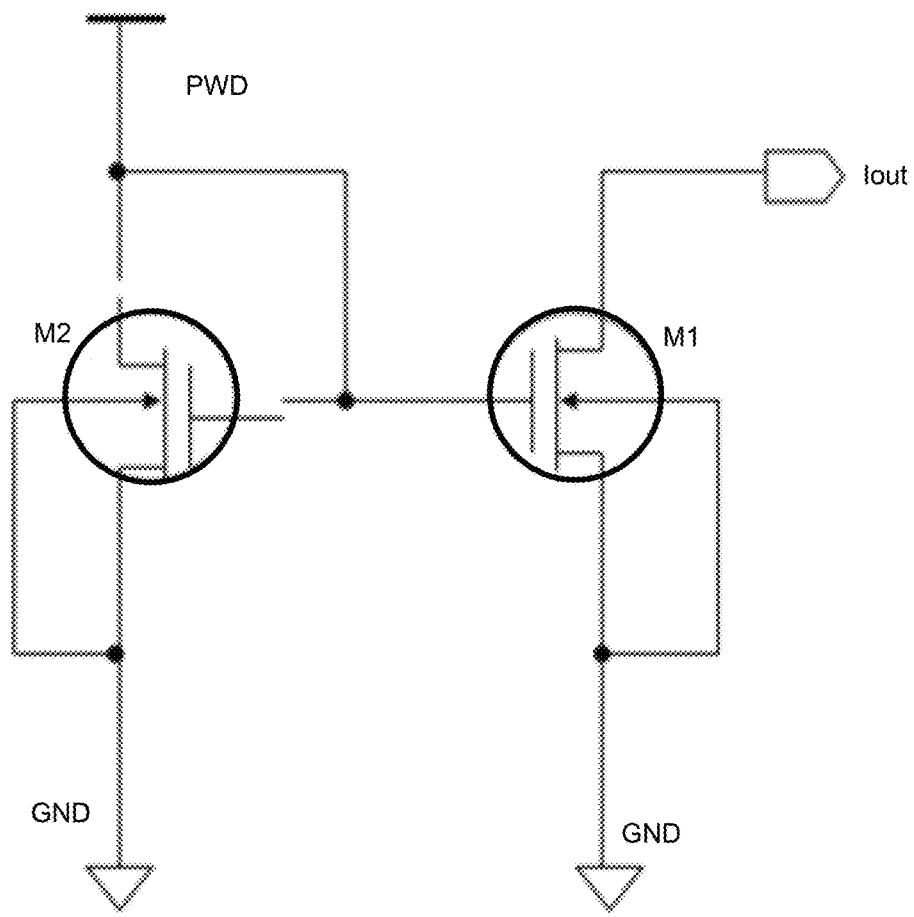
FIG. 7 is a schematic depicting a current mirror in accordance with an embodiment of the present disclosure.

Referring now to FIG. 7, an example schematic of a current mirror is provided. In this particular example, there are certain conditions that must be met. Namely, the devices M1 and M2 of the current mirror have the same model name (subtype), number of fingers (>=1), finger width, and finger length and other parameters. The devices M1 and M2 of the current mirror should be symmetrically placed. The distance between the devices M1 and M2 should be within some predefined value (e.g., 3 um).

In some embodiments, these conditions may be expressed via a set of constraints. It is implied that the following 'virtual' constraints may be associated with this structure:
  M1, M2 matchedParameters;
  M1, M2 matchedTopology or Symmetry (for symmetrical structure);
  Distance constraint on M1, M2 with max distance.

In some embodiments, if a designer has current mirrors in his/her design, they may want to check how well they are implemented in the design (e.g., to check if the conditions above are good enough kept in the layout). These conditions may be expressed via a set of constraints specified above, and they may be checked by PVS CV. This may involve some or all of the operations outlined below:
  Receiving a description of structure of interest (e.g. CDL, etc.).
  In the PERC rule file: write code for searching this structure and define virtual constraints for this structure.
  PERC runs with this rule file, locates all occurrences of the structure of interest and for each occurrence converts virtual constraints to real ones.
  PVS CV accepts and checks recognized constraints in layout data of the design.

Figure 8:
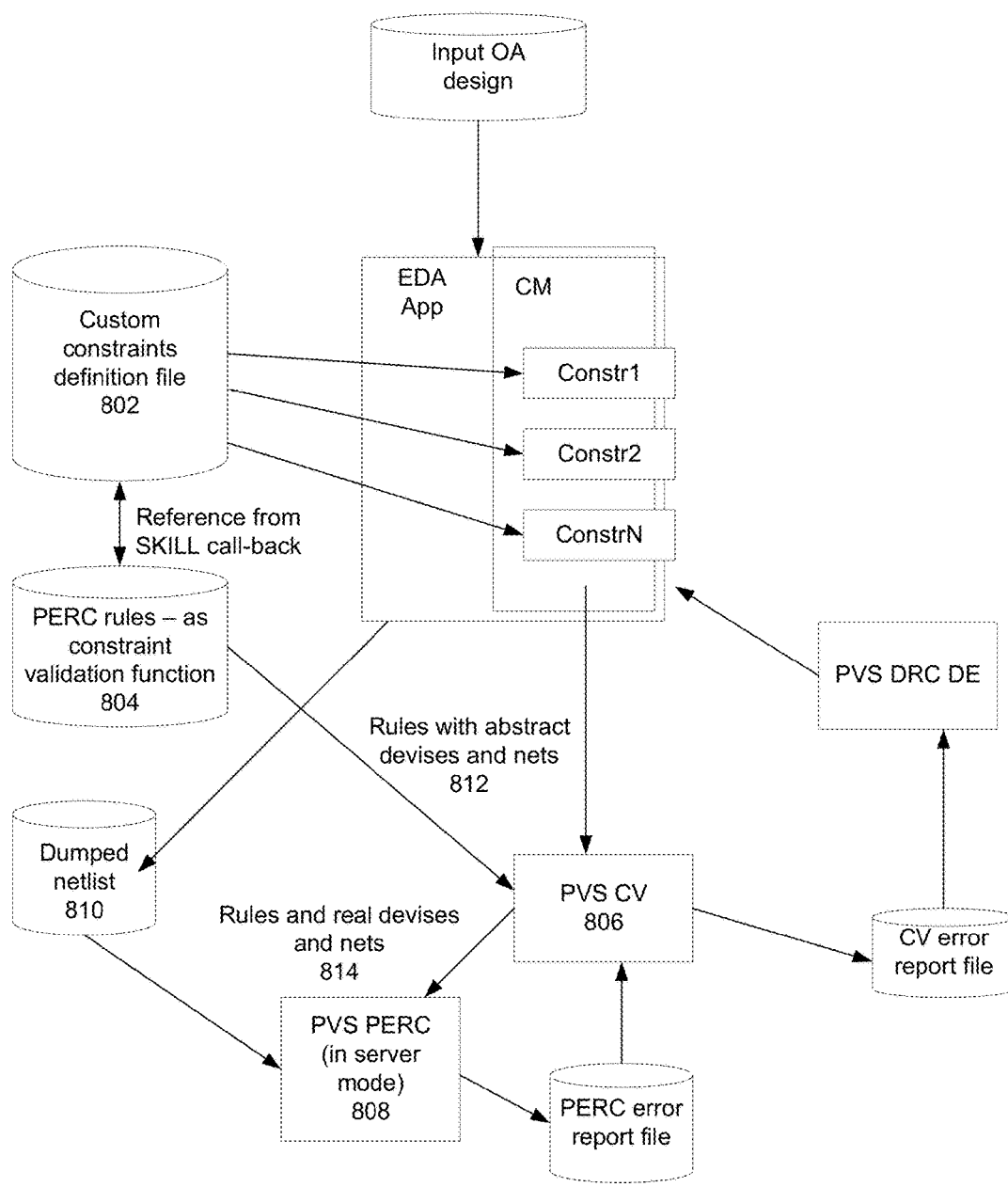
FIG. 8 is a schematic depicting aspects of the constraint validation process in accordance with an embodiment of the present disclosure.

Referring now to FIG. 8, embodiments of constraint validation process 10 depicting electrical custom constraints validation are provided. As discussed above the PVS CV tool may be configured to address implementation constraints in a design layout and may not cover electrical constraint validation. Moreover, there are some electrical and specific custom constraints which require validation functions based on complex schematic analysis and electrical rules checking. PVS PERC may be configured to handle schematics and may provide the required analysis and electrical rule checks. Thus, embodiments of constraint validation process 10 may be configured to integrate these two tools to extend constraint validation functionality in order to have the ability to validate complex electrical constraints.

In some embodiments, some custom constraints may have their own validation functions (e.g., user-defined SKILL call-back functions). The content and functionality of these call-back functions is entirely under customer responsibility and has limited ability. However, there are certain checks that may be defined as specific PERC rules, and thus may be used for appropriate custom constraints validation. However, in existing approaches, these rules cannot be used for checking these constraints directly.

Accordingly, embodiments of constraint validation process 10 may integrate one or more PVS tools, (e.g., CV and PERC) that may allow the user to solve the problems described above. This integration may be implemented as the CV+PERC flow for specific custom constraints validation. As a result, due to this flow custom constraints may obtain access through PVS CV to powerful functionality of PVS PERC for electrical custom constraints validation. Therefore, constraint validation process 10 may enable validation of complex electrical constraints that require schematic analysis and electrical rule checking.

In some embodiments, constraint validation process 10 may utilize PERC functionality. For example, the ability to define specific PERC rules, related to devices and/or nets that can be constraint members, and check them. Additionally and/or alternatively, constraint validation process 10 may utilize CV functionality. For example, constraint validation process 10 may interface with an EDA constraint infrastructure and associated GUI, thus providing the ability to handle constraints, their members and parameters.

In some embodiments, a custom constraint definition file 802 may include a template of user-defined constraint types with 'abstract' members. It may include a call-back validation function (e.g., SKILL validation function) which contains reference to PERC rule(s) 804 that performs necessary check related to the constraint members. Custom constraint creation may be performed via an EDA application constraint manager with real objects as its member. Constraint validation process 10 may be configured to run CV to check the constraints 806. For each constraint, the CV may invoke the call-back validation function, which in turn executes PERC 808 with appropriate rules to check them on an already generated netlist 810 of the input design. Here, 'abstract' members in the rules may be replaced with actual members of current constraints 812-814. Accordingly, PERC rules may serve as 'external' validation function for custom constraints. In some embodiments, PERC may be modified to act as a server 808 and may load input data once at the beginning and then wait to execute the next portion of rules to validate next constraint. PERC may create an error report and pass it back to CV, which may read the report and create appropriated error markers of failed constraint for error browser. For example, in a current direction constraint the current direction through the devices PM1, PM2 . . . , PM10 must be the same. PERC may be able to define current direction for each device member by analyzing netlist structure to find current path form any device terminal to PWD and to GND.

In some embodiments, constraint validation process 10 may allow a PVS PERC and CV integrated flow for virtual and custom constraints validation. Additionally and/or alternatively, embodiments disclosed here may allow for bi-directional flow. For example, PERC→CV→EDA in the virtual constraints validation examples or EDA→CV→PERC in the specific custom constraints examples.

In some embodiments, an EDA application such as a circuit prospector may create appropriate constraints for particular schematic cell view. Virtual constraints defined for schematic pattern may be searched over the design and may be converted to real constraints for each recognized occurrence of the pattern.

An advantage of constraint validation process 10 is that it may be applied not only to an OA design, but to others (including, for example, GDSII, OASIS, etc.) which cannot contain constraints. The flow in that case may include an LVS step and PERC may be applied to extracted netlist for searching schematic structures matching pattern with virtual constraints.

In some embodiments, EDA application 20 may support a variety of languages and/or standards. Some of these may include, but are not limited to, CDL, IEEE-standard languages, the Open Verification Methodology (OVM), the emerging Accellera Universal Verification Methodology (UVM), and the e Reuse Methodology (eRM). EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for constraint validation in an electronic design comprising:
   receiving, at one or more computing devices, an electronic design at an electronic design automation application;
   analyzing at least a portion of the electronic design at a constraint validation tool configured to analyze one or more physical constraints in a design layout associated with the electronic design;
   specifying a topological pattern associated with, but not part of, the electronic design, wherein the topological pattern includes guidelines provided by a foundry, formulated by a designer community, or provided by a design team;
   applying one or more programmable electrical rule check ("PERC") rules and one or more constraints to the electronic design, wherein the one or more PERC rules are configured to perform one or more electrical rule checks, wherein the one or more constraints include virtual constraints and wherein the virtual constraints include at least one net or device associated with the topological pattern that does not exist in the electronic design.

2. The computer-implemented method of claim 1, wherein the one or more constraints include custom electrical constraints.

3. The computer-implemented method of claim 2, wherein applying one or more custom electrical constraints includes receiving a custom electrical constraints definition file.

4. The computer-implemented method of claim 2, further comprising: generating at least one custom constraint at a constraint manager associated with the electronic design automation application.

5. The computer-implemented method of claim 2, wherein applying one or more PERC rules includes applying the one or more PERC rules as a constraint validation function.

6. The computer-implemented method of claim 2, further comprising:
   enabling multi-directional data transmission between at least two of the electronic design automation application, the constraint validation tool, and the one or more PERC rules.

7. The computer-implemented method of claim 1, wherein the one or more PERC rules includes at least one command configured to enable searching topological patterns in a dumped netlist associated with the electronic design.

8. The computer-implemented method of claim 1, further comprising:
converting the one or more virtual constraints to actual constraints; and
generating a database including, at least in part, the actual constraints.

9. A system comprising:
a computing device configured to receive an electronic design at an electronic design automation application, the computing device further configured to analyze at least a portion of the electronic design at a constraint validation tool configured to analyze one or more physical constraints in a design layout associated with the electronic design, the computing device further configured to specify a topological pattern associated with, but not part of, the electronic design, wherein the topological pattern includes guidelines provided by a foundry, formulated by a designer community, or provided by a design team, the computing device being further configured to apply one or more programmable electrical rule check ("PERC") rules and one or more constraints to the electronic design, wherein the one or more PERC rules are configured to perform one or more electrical rule checks, wherein the one or more constraints include virtual constraints and wherein the virtual constraints include at least one net or device associated with the topological pattern that does not exist in the electronic design.

10. The system of claim 9, wherein the one or more constraints include custom electrical constraints.

11. The system of claim 10, wherein applying one or more custom electrical constraints includes receiving a custom electrical constraints definition file.

12. The system of claim 10, wherein the computing device is further configured to generate at least one custom constraint at a constraint manager associated with the electronic design automation application.

13. The system of claim 10, wherein applying one or more PERC rules includes applying the one or more PERC rules as a constraint validation function.

14. The system of claim 10, wherein the computing device is further configured to enable multi-directional data transmission between at least two of the electronic design automation application, the constraint validation tool, and the one or more PERC rules.

15. The system of claim 9, wherein the one or more PERC rules includes at least one command configured to enable searching topological patterns in a dumped netlist associated with the electronic design.

16. The system of claim 9, wherein the computing device is further configured to convert the one or more virtual constraints to actual constraints and to generate a database including, at least in part, the actual constraints.

* * * * *

UNITED STATES PATENT AND TRADEMARK OFFICE
CERTIFICATE OF CORRECTION

Page 1 of 1

PATENT NO. : 10,216,888 B2
APPLICATION NO. : 15/142843
DATED : February 26, 2019
INVENTOR(S) : Mikhail Kanshin et al.

It is certified that error appears in the above-identified patent and that said Letters Patent is hereby corrected as shown below:

On the Title Page

Please insert:
Item --(30), Foreign Application Priority
RU 2015144655 Oct. 16, 2015--

Signed and Sealed this
Seventh Day of January, 2020

Andrei Iancu
*Director of the United States Patent and Trademark Office*